(12) United States Patent
Gruetzner et al.

(10) Patent No.: US 10,587,169 B2
(45) Date of Patent: Mar. 10, 2020

(54) ROTOR FOR AN ELECTRIC MACHINE

(71) Applicant: VOLKSWAGEN AKTIENGESELLSCHAFT, Wolfsburg (DE)

(72) Inventors: Stefan Gruetzner, Kassel (DE); Christian Riehm, Kassel (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 254 days.

(21) Appl. No.: 15/604,909

(22) Filed: May 25, 2017

(65) Prior Publication Data

US 2017/0346371 A1     Nov. 30, 2017

(30) Foreign Application Priority Data

May 25, 2016   (DE) .......................... 10 2016 209 173

(51) Int. Cl.
  *H02K 9/197*    (2006.01)
  *H02K 9/19*     (2006.01)
  *H02K 1/32*     (2006.01)

(52) U.S. Cl.
  CPC .............. *H02K 9/197* (2013.01); *H02K 1/32* (2013.01); *H02K 9/19* (2013.01)

(58) Field of Classification Search
  CPC ...... H02K 1/32; H02K 2209/00; H02K 9/197; H02K 9/19; H02K 2201/06
  USPC .... 310/61, 60 A, 216.011, 216.013, 216.014
  See application file for complete search history.

(56) References Cited

U.S. PATENT DOCUMENTS

| 6,734,585 B2 * | 5/2004 | Tornquist ............... H02K 1/325 310/52 |
| 6,750,572 B2 * | 6/2004 | Tornquist ................. H02K 9/19 310/54 |
| 7,049,717 B2 | 5/2006 | Frank et al. |
| 7,489,057 B2 | 2/2009 | Zhou et al. |
| 8,558,424 B2 * | 10/2013 | Auten ..................... F03B 13/10 310/90.5 |

(Continued)

FOREIGN PATENT DOCUMENTS

| DE | 10336277 A1 | 3/2005 |
| DE | 102011006280 A1 | 10/2012 |

(Continued)

*Primary Examiner* — Jeremy A Luks
(74) *Attorney, Agent, or Firm* — Laurence A. Greenberg; Werner H. Stemer; Ralph E. Locher

(57) ABSTRACT

A rotor for an electric machine is formed of a rotor shaft and a rotor body which is non-rotatably mounted on the rotor shaft. At least sections of the rotor shaft are configured as a hollow shaft. A delivery screw is non-rotatably mounted in the hollow shaft for conveying a cooling fluid in a first direction through the hollow shaft. In order to provide an improved cooling of the rotor, the rotor body is formed with at least one cooling channel which extends in the axial direction. The cooling channel has an end-face inlet opening and an end-face outlet opening positioned on the opposite side for the cooling fluid. The cooling fluid conveyed in the first direction through the hollow shaft can be at least partially directed through the inlet opening into the cooling channel and conveyed in a second direction, which is counter to the first direction, to the outlet opening.

11 Claims, 7 Drawing Sheets

(56) References Cited

U.S. PATENT DOCUMENTS

| | | | | |
|---|---|---|---|---|
| 8,896,167 B2* | 11/2014 | McKinzie | ................ | H02K 1/32 310/61 |
| 2015/0280525 A1* | 10/2015 | Rippel | .................... | H02K 9/19 310/54 |
| 2015/0288255 A1* | 10/2015 | Barker | .................... | H02K 1/32 310/43 |
| 2016/0352186 A1 | 12/2016 | Faistauer et al. | | |

FOREIGN PATENT DOCUMENTS

| | | |
|---|---|---|
| DE | 102011007255 A1 | 10/2012 |
| DE | 102014202056 A1 | 9/2015 |
| DE | 102014212167 A1 | 12/2015 |
| EP | 2975742 A1 | 1/2016 |

* cited by examiner

ROTOR FOR AN ELECTRIC MACHINE

CROSS-REFERENCE TO RELATED APPLICATION

This application claims the priority, under 35 U.S.C. § 119, of German patent application DE 10 2016 209 173.5, filed May 25, 2016; the prior application is herewith incorporated by reference in its entirety.

BACKGROUND OF THE INVENTION

Field of the Invention

The invention relates to a rotor for an electric machine, consisting of a rotor shaft and a rotor body which is non-rotatably mounted on the rotor shaft. At least sections of the rotor shaft are designed as a hollow shaft in which a delivery screw is non-rotatably mounted, by means of which a cooling fluid can be conveyed through the hollow shaft in a first direction.

Electric machines can be used, on the one hand, as a generator for electric power generation and, on the other hand, as a drive motor, in particular as a drive for a motor vehicle. An electric machine comprises a stator and a rotatably mounted rotor. Losses occurring during the operation of the electric machine, for example, heat loss due to current as well as magnetic hysteresis losses and eddy current losses, result in a heating of the components of the electric machine. In order to ensure reliable operation of the electric machine, it is necessary to avoid an overheating of the components, which can result in a reduction of the service life or in a total failure of the electric machine.

Highly effective cooling can be achieved, in particular, by means of a moving, in particular liquid, cooling fluid. Oil or cooling water, for example, can be used as the cooling fluid. It is already known to provide a cooling jacket, which surrounds the stator and in which the cooling fluid circulates, for the purpose of cooling the electric machine. As a result, however, effective cooling of the rotor situated in the stator cannot be ensured.

A cooling system for a rotor of an electric machine is described, by way of example, in U.S. Pat. No. 7,489,057 B2. In that case, a cooling fluid circulates in a rotor shaft designed as a hollow shaft. A feed tube through which a cooling fluid can flow is fixed in the hollow shaft in such a way that an annular channel is formed between the outer surface of the feed tube and the inner surface of the hollow shaft, through which the cooling fluid can also flow. The feed tube is fixed in the hollow shaft by means of a helical support, and therefore the feed tube and the support in combination form a delivery screw. The cooling fluid is initially conveyed through the feed tube by means of a pump until the fluid is deflected at a closed end section of the hollow shaft in such a way that the fluid enters the annular channel. In this channel, the cooling fluid is then moved in the opposite direction by the delivery screw. As a result, a cooling of the rotor body situated on the rotor shaft takes place, which is not sufficient, however, in particular in the case of electric machines for a vehicle drive, to ensure trouble-free operation of the electric machine.

U.S. Pat. No. 7,049,717 B2 and its counterpart German published patent application DE 103 36 277 A1 discloses an electric machine for a marine vessel, in the case of which a delivery screw is situated in a hollow space of a rotor shaft. During a standby mode of the electric machine, the rotor is rotated slowly by way of a rotating means. As a result of this slow rotation, the delivery screw conveys a coolant from a coolant inlet side to the opposite side. As a result, the coolant is held in the entire inner chamber of the rotor shaft during the standby mode of the electric machine.

European published patent application EP 2 975 742 A1 describes an electric machine consisting of a rotor and a stator, wherein the stator is surrounded by a heat-exchanger jacket for cooling purposes. In order to ensure an improved heat transfer, the heat exchanger jacket comprises a guide element, which extends helically about a rotational axis, for conveying a cooling fluid.

SUMMARY OF THE INVENTION

It is accordingly an object of the invention to provide a rotor for an electric machine which overcomes the above-mentioned and other disadvantages of the heretofore-known devices and methods of this general type and which provides for improved cooling for a rotor intended for an electric machine.

With the foregoing and other objects in view there is provided, in accordance with the invention, a rotor for an electric machine, the rotor comprising:

a rotor shaft and a rotor body non-rotatably mounted to said rotor shaft, said rotor shaft being a hollow shaft at least in sections thereof;

a delivery screw non-rotatably mounted in said hollow shaft and configured to convey a cooling fluid through said hollow shaft in a first direction;

said rotor body being formed with at least one cooling channel for the cooling fluid, said at least one cooling channel extending in an axial direction and including an end-face inlet opening and an end-face outlet opening on mutually opposite sides, wherein the cooling fluid conveyed in the first direction through said hollow shaft is at least partially directed through said inlet opening into said cooling channel and then conveyed in a second direction, counter to the first direction, to said outlet opening.

In other words, according to the invention, a rotor for an electric machine, which consists of a rotor shaft and a rotor body, is provided, in which the rotor body comprises at least one cooling channel which extends in the axial direction and includes an end-face inlet opening and an end-face outlet opening positioned on the opposite side for the cooling fluid, wherein the cooling fluid conveyed in the first direction through the hollow shaft can be at least partially directed through the inlet opening into the cooling channel and can be conveyed in a second direction, which is counter to the first direction, to the outlet opening. Due to the return of the cooling fluid—which has been conveyed through the rotor shaft—through the cooling channel situated in the rotor body itself, an improved and active internal cooling of the rotor is provided. The cooling fluid flowing through the cooling channel can absorb the waste heat of the rotor directly at the point at which the heating of the rotor by the heat loss due to current as well as magnetic hysteresis losses and eddy current losses occurring during operation takes place, namely in the rotor itself. During operation of the electric machine, a fluid mass flow through the hollow shaft and the cooling channel takes place due solely to the rotary movement of the rotor or due to the rotation of the delivery screw situated on the rotor shaft, and therefore optimal cooling of the rotor is achieved without the aid of a pump or the like. Advantages result, in turn, with respect to the required installation space, the weight, and the costs of the electric machine.

It proves to be particularly advantageous that the inlet opening and/or the outlet opening of the cooling channel in the rotor body are/is fluidically connected to the inner chamber delimited by the hollow shaft. An autonomously operating, in particular closed, cooling circuit results, which provides for an optimal absorption of the waste heat of the rotor during operation of the electric machine.

The introduction of the cooling fluid into the cooling channel in the rotor body and the deflection of the cooling-fluid flow is achieved by way of the hollow shaft comprising at least one first radial opening for the emergence of the cooling fluid, which has been conveyed through the hollow shaft out of the hollow shaft, wherein a guide element, which guides the cooling fluid, is provided between the first radial opening in the hollow shaft and the inlet opening of the cooling channel. The cooling fluid moved in the hollow shaft by the delivery screw is carried radially outward by means of centrifugal force and, upon reaching the opening, is conveyed out of the hollow shaft through the opening. A deflection of the cooling-fluid flow into an axial direction counter to the flaw in the hollow shaft then takes place by means of the guide element.

It proves to be advantageous that the hollow shaft comprises at least one second radial opening for the entry by the cooling fluid which has been conveyed through the cooling channel of the rotor body into the hollow shaft, wherein a guide element, which guides the cooling fluid, is provided between the outlet opening of the cooling channel and the second radial opening in the hollow shaft. As a result, an autonomously operating, closed cooling circuit is provided.

The return of the cooling fluid from the cooling channel in the rotor body into the hollow shaft is assisted by way of the delivery screw being designed as a right-hand or left-hand and single-start or multiple-start helix. Due to the rotation of the helix, a negative pressure is generated, which directs the cooling fluid from the cooling channel in the rotor body through the second radial opening and back into the hollow shaft.

In accordance with an added feature of the invention, the at least one cooling channel in the rotor body is designed as a helix which extends in the opposite direction of the helix of the delivery screw. Due to such a helical embodiment of the cooling channel, upon rotation of the rotor in the cooling channel, a fluid mass flow is generated in the axial direction, which is counter to the fluid mass flow in the hollow shaft.

One advantageous refinement of the present invention is also created by way of the rotor body being designed as a rotor laminated core consisting of several rotor laminations, wherein the at least one cooling channel is formed by recesses in the rotor laminations. In this case, each of the rotor laminations of the laminated core therefore comprises at least one recess which is situated in such a way that the recesses in the adjacent rotor laminations, in combination, form the cooling channel in the rotor body or rotor laminated core.

In this case, it proves to be particularly advantageous that the recesses in adjacent rotor laminations have an offset in the circumferential direction between 3° and 7° in each case, and therefore the recesses in the rotor laminations, in combination, form a helical cooling channel. Due to the offset of the rotor laminations, the cooling channel can be designed as a helix. The size of the offset establishes the slope of the helix in this case. Depending on the direction of the offset, either a left-hand helix or a right-hand helix can be produced.

A particularly advantageous embodiment of the invention is also achieved by way of the rotor body comprising several axially extending cooling channels which are evenly distributed in the circumferential direction and by way of the hollow shaft comprising several first radial openings and/or several second radial openings which are evenly distributed in the circumferential direction in the hollow shaft. As a result, an internal cooling of the rotor is provided, which has an optimized cooling performance over the entire circumference of the rotor body.

Other features which are considered as characteristic for the invention are set forth in the appended claims.

Although the invention is illustrated and described herein as embodied in a rotor for an electric machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
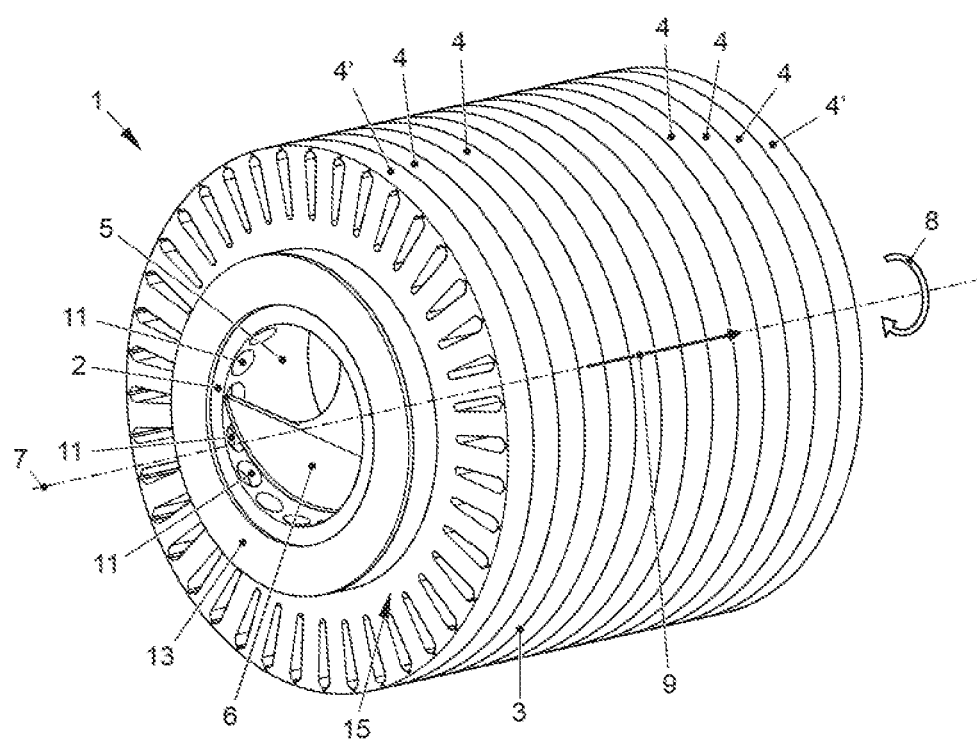
FIG. 1 shows a perspective representation of a rotor according to the invention for an electric machine.
Figure 2:
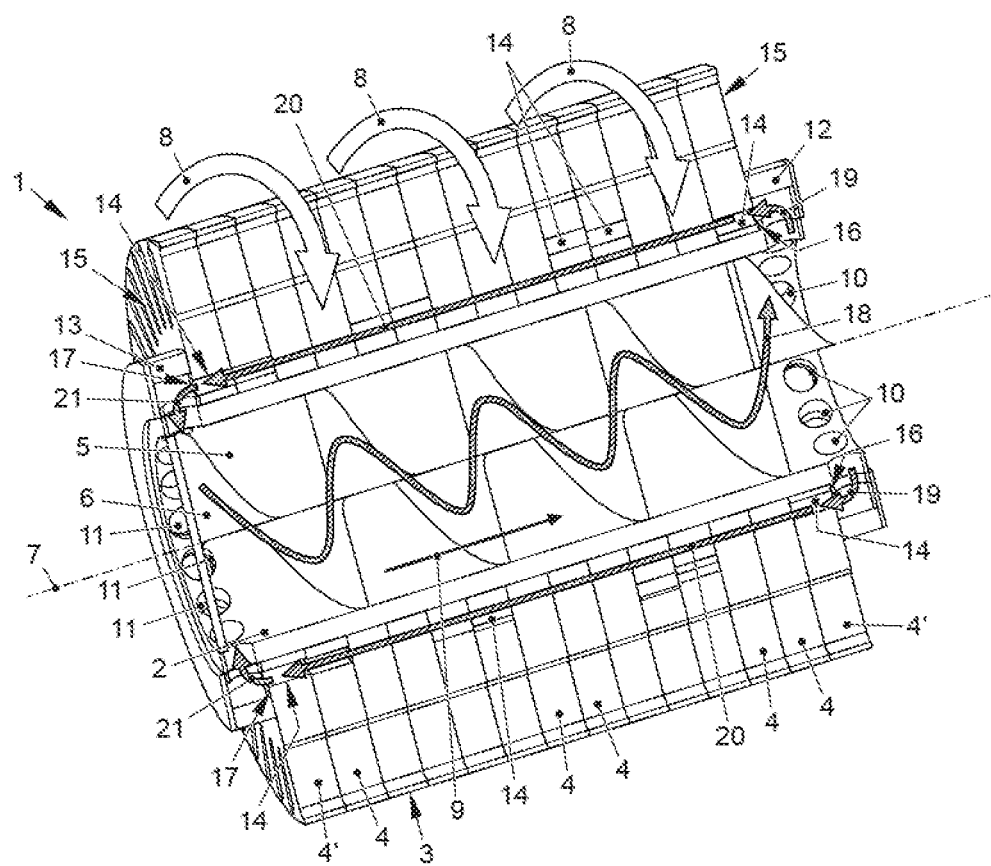
FIG. 2 shows a sectional representation of the rotor depicted in FIG. 1.

Referring now to the figures of the drawing in detail and first, particularly, to FIGS. 1 and 2 thereof, there are shown different representations of a rotor 1 for a non-illustrated electric machine having internal cooling of the rotor according to the invention. The rotor 1 consists of a rotor shaft, which is formed by a hollow shaft 2, and a rotor body 3 which is non-rotatably mounted on the shaft or is connected to the shaft. The rotor body 3 is designed as a rotor laminated core composed of several rotor laminations 4, 4'. A delivery screw 6 is non-rotatably mounted in an inner chamber 5 of the hollow shaft 2, in particularly having been shrink-fitted into the hollow shaft 2. During the operation of the electric machine, the rotor body 3, the hollow shaft 2, and the delivery screw 6 rotate together about a rotational axis 7. This rotation is represented by one or several direction arrows 8.

For the purpose of absorbing the waste heat of the rotor 1 that arises during the operation of the electric machine, a cooling fluid is provided, which is conveyed or pumped axially in a first direction (direction arrow 9) through the hollow shaft 2 due to the rotation of the rotor 1 or the delivery screw 6.

The hollow shaft 2 comprises several first and second radial openings 10, 11 for the cooling fluid, which are evenly distributed in the circumferential direction and are situated outside of an overlap region between the rotor body 3 and the hollow shaft 2 and adjacent to the particular outer rotor laminations 4' of the rotor laminated core. The first and the second radial openings 10, 11 are each fluidically connected to several cooling channels 14 situated in the rotor body 3 by means of a guide element 12, 13 surrounding the hollow shaft 2. The cooling channels 14 extend between the two end faces 15 of the rotor body 3, are evenly distributed around the circumference, and each have an end-face inlet opening 16 and an end-face outlet opening 17.

As described above, during the operation of the electric machine, the cooling fluid is conveyed axially through the hollow shaft 2 (direction arrow 9) in the first direction due to the rotary motion of the delivery screw 6. The helical direction arrow 18 indicates the flow conditions of the cooling fluid within the hollow shaft 2. When the cooling fluid reaches the first radial openings 10, the cooling fluid leaves the hollow shaft 2 through the openings as a result of centrifugal force. The cooling fluid, having been deflected by means of the guide element 12, is then directed into the inlet openings 16 of the cooling channels 14 in the rotor body 3 (direction arrow 19) and is conveyed, in a second direction which is counter to the first direction, through the cooling channels 13 to the outlet openings 17 (direction arrow 20). The cooling fluid emerging from the outlet openings 17 is deflected by means of the assigned guide element 13 and returns to the hollow shaft 2 through the second radial openings 11 (direction arrow 21).

Figure 3:
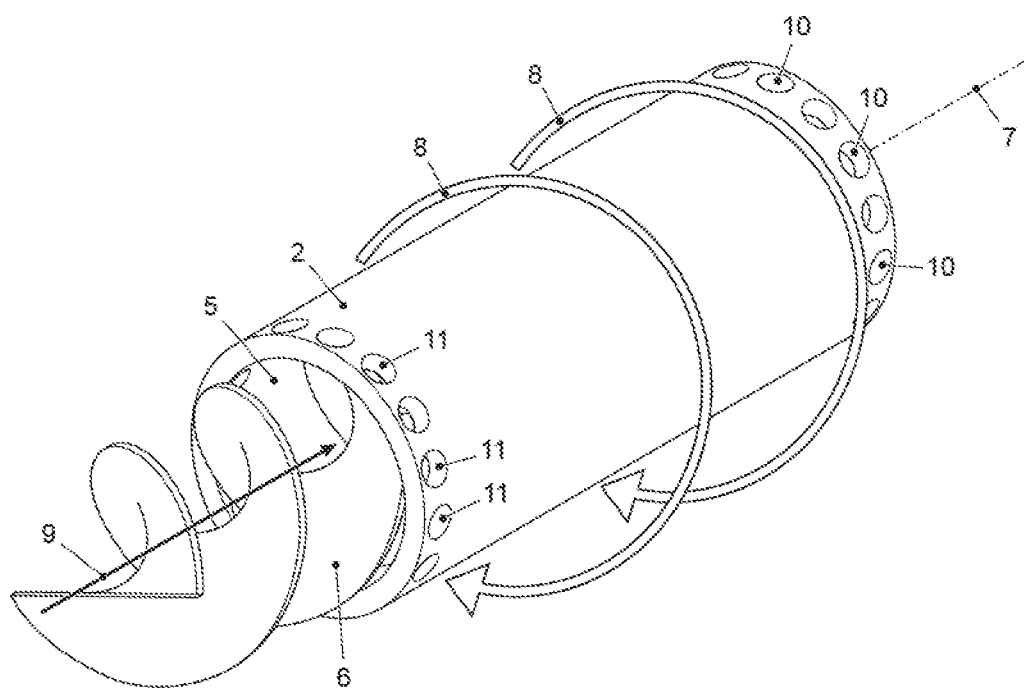
FIG. 3 shows a perspective representation of an enlarged view of the hollow shaft of the rotor comprising an integrated delivery screw.
Figure 4:
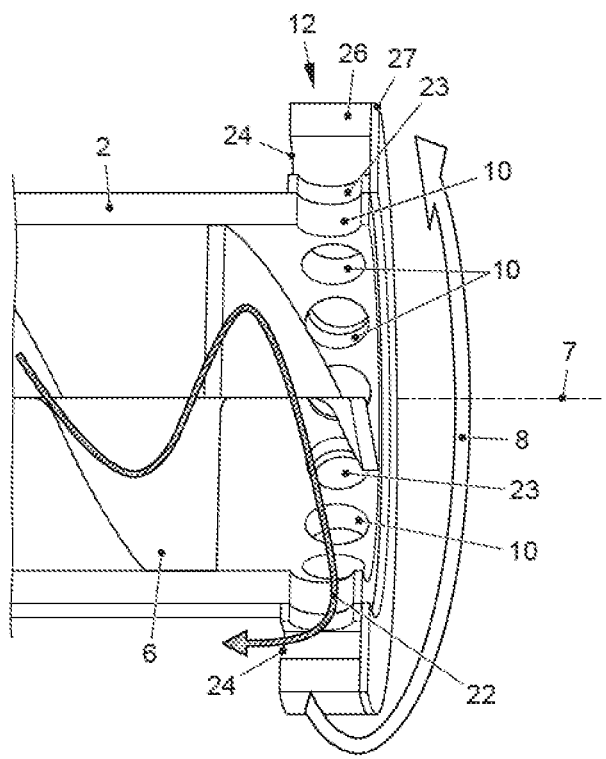
FIG. 4 shows a cut representation of an enlarged view of a guide element surrounding the hollow shaft.
Figure 5:
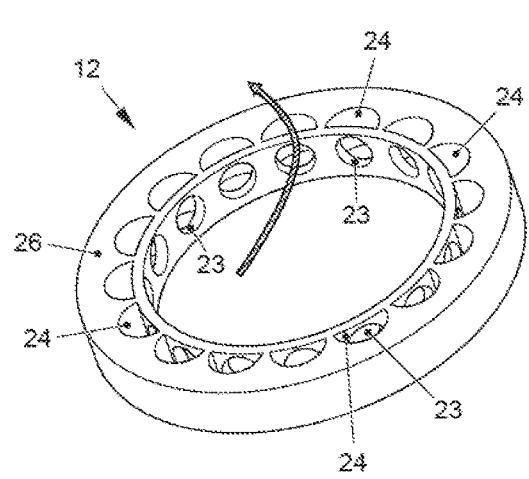
FIG. 5 shows a perspective representation of an enlarged view of a main body of the guide element.
Figure 6:
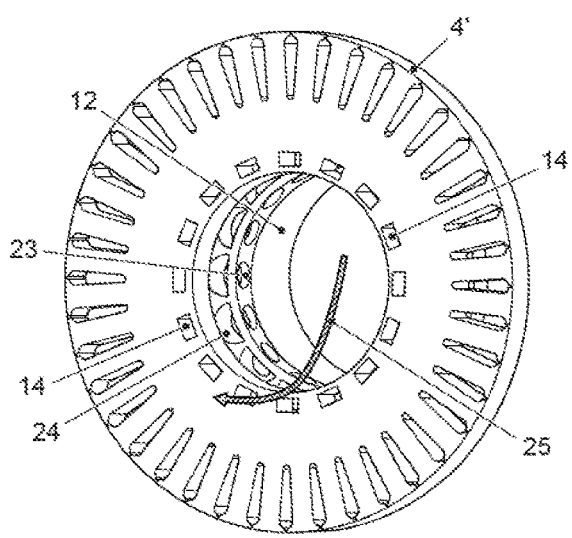
FIG. 6 shows an enlarged view of a guide element comprising a rotor lamination.
Figure 7:
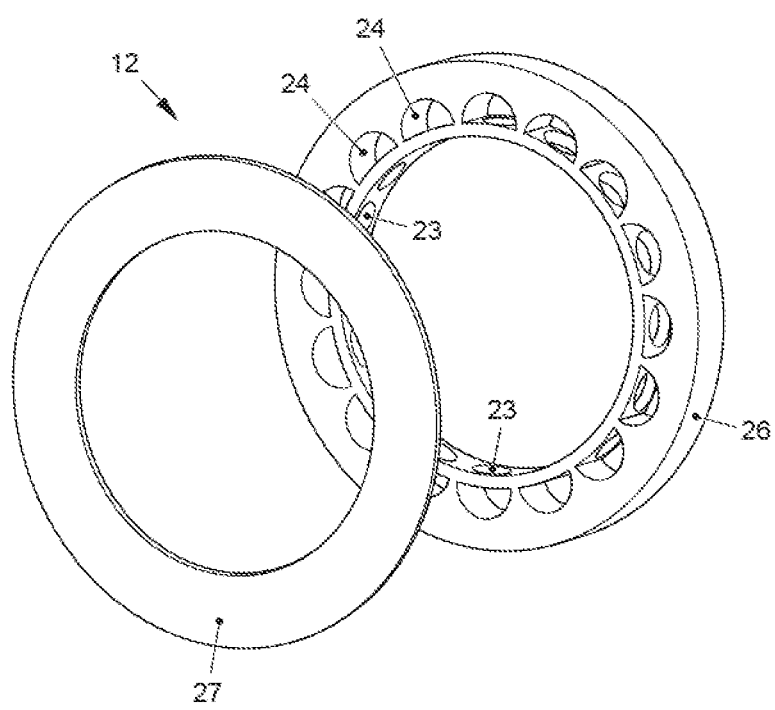
FIG. 7 shows a perspective representation of an enlarged view of the guide element.

FIG. 3 shows an enlarged representation of the hollow shaft 2 comprising the shrink-fitted delivery screw 6 and, in fact, without the rotor body 3 and the guide elements 12, 13. The delivery screw 6 is designed as a left-hand double helix in the manner of an Archimedean screw, and therefore a mass flow of the cooling fluid is generated in a first axial direction (direction arrow 9) due to the rotation of the delivery screw 6 (direction arrow 8). In principle, the delivery screw 6 can be designed as a right-hand or left-hand helix and as a single-start or multiple-start helix. Clearly shown as well in FIG. 3 are the first radial openings 10, which are situated in the hollow shaft 2, and the second radial openings 11 which are evenly distributed on the circumference of the hollow shaft 2.

The embodiment of the guide elements 12, 13 for deflecting the cooling fluid is described in greater detail in the following with reference to FIGS. 4 to 7. The guide element 12 represented in FIG. 4 surrounds the hollow shaft 2 in the region of the first radial openings 10 in such a way that cooling fluid emerging from the openings as a result of centrifugal force is deflected (see direction arrow 22 in FIG. 4). For this purpose, the annular guide element 12 comprises several radial openings 23 which are evenly distributed on the circumference (see also FIG. 5) and which, in the case of a guide element 12 situated on the hollow shaft 2, are situated so as to be congruent with the first radial openings 10 in the hollow shaft 2 (see FIG. 4). In addition, the guide element 12 comprises several axial openings 24 which are evenly distributed on the circumference (see FIG. 5) and which are fluidically connected to the radial openings 23 in the guide element 12 by means of a claw-shaped cavity. The axial openings 24 are congruent with the inlet openings 16 in the rotor body 3 or the adjacent rotor lamination 4', and therefore the cooling fluid can be directed through the inlet openings 16 into the cooling channels 14 (see direction arrow 25 in FIG. 6). The guide element 12 represented in the figures is designed as two pieces and comprises an end-face cover 27 next to the main body 26 which has the openings 23, 24, the end-face cover and the main body being connected to each other in a fluid-tight manner (see FIGS. 4 and 7).

Figure 8:
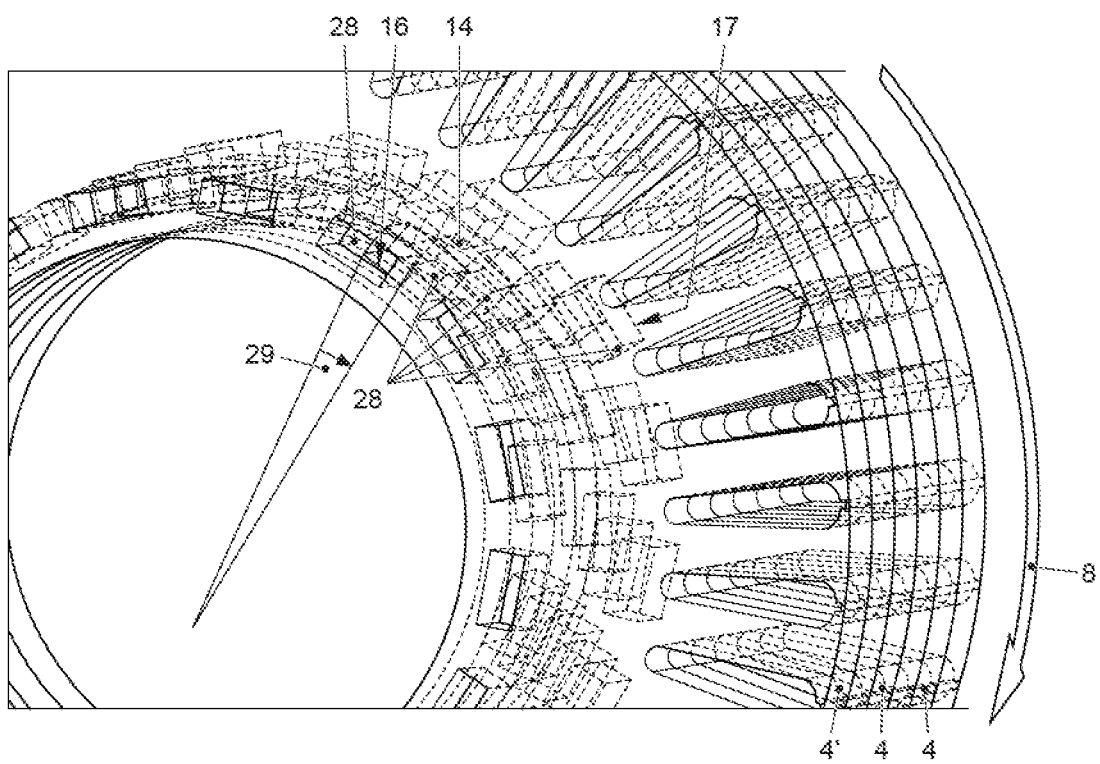
FIG. 8. shows an enlarged representation of the rotor body which consists of several rotor laminations.

FIG. 8 shows a perspective representation of the rotor body 3, which consists of several rotor laminations 4, 4', or the rotor laminated core. The cooling channels 14, which are evenly distributed around the circumference, are each formed by recesses 28 in adjacent rotor laminations 4. In the exemplary embodiment shown, the recesses 28 in the adjacent rotor laminations 4, 4' which, in combination, form a cooling channel 14, have an offset 29 of approximately 3° to 7° in the circumferential direction, and therefore a helical cooling channel 14 forms. The cooling channels 14 in combination form a multiple-start, right-hand helical structure, wherein the helix of the cooling channels 14 extends in the direction opposite to that of the helix or the double helix of the delivery screw 6. As a result of the contradirectional, multiple-start helix, a mass flow is generated in the cooling channels 14, which is opposite to the mass flow in the hollow shaft 2, during a rotation of the rotor body 3.

The following is a summary list of reference numerals and the corresponding structure used in the above description of the invention:

| | |
|---|---|
| 1 | rotor |
| 2 | hollow shaft |
| 3 | rotor body |
| 4, 4' | rotor lamination |
| 5 | inner chamber |
| 6 | delivery screw |
| 7 | rotational axis |
| 8 | direction arrow |
| 9 | direction arrow |
| 10 | first radial opening |
| 11 | second radial opening |
| 12 | guide element |
| 13 | guide element |
| 14 | cooling channel |
| 15 | end face |
| 16 | inlet opening |
| 17 | outlet opening |
| 18 | direction arrow |
| 19 | direction arrow |
| 20 | direction arrow |
| 21 | direction arrow |
| 22 | direction arrow |
| 23 | radial opening |
| 24 | axial opening |
| 25 | direction arrow |
| 26 | main body |
| 27 | cover |
| 28 | recess |
| 29 | offset |

The invention claimed is:

1. A rotor for an electric machine, the rotor comprising:
a rotor shaft and a rotor body non-rotatably mounted to said rotor shaft, said rotor shaft being a hollow shaft at least in sections thereof;
a delivery screw non-rotatably mounted in said hollow shaft and configured to convey a cooling fluid through said hollow shaft in a first direction being an axial direction extending along an axis of said hollow shaft;
said rotor body being formed with at least one cooling channel for the cooling fluid, said at least one cooling channel extending in an axial direction and including an end-face inlet opening and an end-face outlet opening on mutually opposite sides, wherein the cooling fluid conveyed in the first direction through said hollow shaft is at least partially directed through said inlet opening into said cooling channel and then conveyed in a second direction, counter to the first direction, to said outlet opening; and wherein said hollow shaft and said at least one cooling channel are fluidically connected, via said end-face inlet opening and said end-face outlet opening, to form an autonomously operating closed cooling circuit within the rotor.

2. The rotor according to claim 1, wherein said hollow shaft delimits an inner chamber and wherein at least one of said inlet opening and said outlet opening of said cooling channel in said rotor body is formed to fluidically communicate with said inner chamber.

3. The rotor according to claim 1, wherein said hollow shaft is formed with at least one first radial opening for an emergence of the cooling fluid, after having been conveyed through said hollow shaft, out of said hollow shaft, and wherein a guide element for guiding the cooling fluid is disposed between said first radial opening in said hollow shaft and said inlet opening of said cooling channel.

4. The rotor according to claim 3, wherein said hollow shaft is formed with at least one second radial opening for an entry of the cooling fluid, after having been conveyed through said cooling channel of said rotor body, into said hollow shaft, and wherein a guide element for guiding the cooling fluid is disposed between said outlet opening of said cooling channel and said second radial opening in said hollow shaft.

5. The rotor according to claim 4, wherein said at least one first radial opening is one of a plurality of first radial openings and/or said at least one second radial opening is one of a plurality of second radial openings evenly distributed in the circumferential direction in said hollow shaft.

6. The rotor according to claim 1, wherein said delivery screw is a right-hand or left-hand single-start or multiple-start helix.

7. The rotor according to claim 6, wherein said at least one cooling channel in said rotor body is a helix that extends in an opposite direction of the helix of said delivery screw.

8. The rotor according to claim 1, wherein said rotor body is a rotor laminated core consisting of a plurality of rotor laminations, and wherein said at least one cooling channel is formed by recesses in said rotor laminations.

9. The rotor according to claim 8, wherein said recesses in adjacent rotor laminations have an offset in a circumferential direction between 3° and 7°, and wherein said recesses in the rotor laminations, in combination, form a helical cooling channel.

10. The rotor according to claim 1, wherein said rotor body is formed with a plurality of axially extending cooling channels that are evenly distributed in a circumferential direction.

11. The rotor according to claim 1, wherein said hollow shaft is formed with a plurality of first radial openings and/or a plurality of second radial openings that are evenly distributed in a circumferential direction in said hollow shaft.

* * * * *